Figure 1:
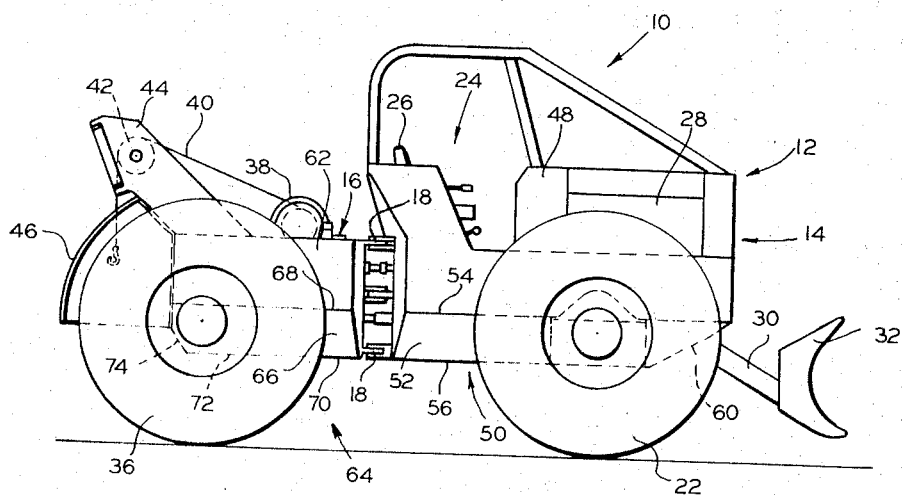

Jan. 16, 1968  R. J. ORPANA  3,363,714
VEHICLE

Filed April 1, 1966  2 Sheets-Sheet 1

INVENTOR
ROBERT J. ORPANA
BY *Robert H Johnson*
ATTORNEY

Jan. 16, 1968  R. J. ORPANA  3,363,714
VEHICLE

Filed April 1, 1966  2 Sheets-Sheet 2

INVENTOR
ROBERT J. ORPANA
BY *Robert H. Johnson*
ATTORNEY

United States Patent Office 3,363,714
Patented Jan. 16, 1968

3,363,714
VEHICLE
Robert J. Orpana, St. Thomas, Ontario, Canada, assignor to Clark Equipment Company, a corporation of Michigan
Filed Apr. 1, 1966, Ser. No. 539,413
5 Claims. (Cl. 180—93)

This invention relates to vehicles, and especially to rough terrain vehicles particularly suitable for logging operations and the like.

In present day logging operations more and more use is being made of vehicles to drag logs from the location in which they are cut to a marshalling area or yard where the logs are then loaded onto trucks, for example, for transportation to a sawmill.

The vehicles which drag the logs from the locations at which they are cut to the marshalling area must be capable of negotiating extremely rough terrain since there are no roads and the terrain may include substantial slopes as well as rocks, stumps, trees and the like. Further, since logging operations are carried on the year around in some areas there are rainy seasons during which the vehicle must operate in extremely adverse mud conditions. These mud conditions often are so adverse that the vehicle must pull a load of logs through mud that extends above the vehicle axles. Under such adverse conditions it is not uncommon for these vehicles to become mired in the mud even though they are equipped with four wheel drive and oversize tires with lugs.

It has been my observation that such vehicles tend to become mired in the mud for two reasons. One reason is that as power is supplied to the drive wheels the vehicle simply tends to dig itself deeper into the mud. The other reason is that if the vehicle is able to get even some traction and starts to lift itself out of the mud that oftentimes a cavity is formed beneath the vehicle which of course creates a vacuum condition and this tends to hold the vehicle in the mud rather than allowing it to come free of the mud. Thus, a principal object of my invention is to provide a vehicle which is particularly suitable for negotiating adverse mud conditions.

A further object of my invention is to provide a vehicle which tends to lift and tip itself when articulated and partially submerged in mud.

In carrying out my invention in a preferred embodiment thereof I provide a vehicle having front and rear portions which are connected together for pivotable movement about a substantially vertical axis. Each portion includes a bottom having a pair of downwardly and inwardly extending surfaces of substantial area so that when the vehicle body is articulated while the surfaces are submerged in a semi-solid mass, such as mud, there is sufficient downward force exerted to lift and tip the vehicle.

Figure 2:
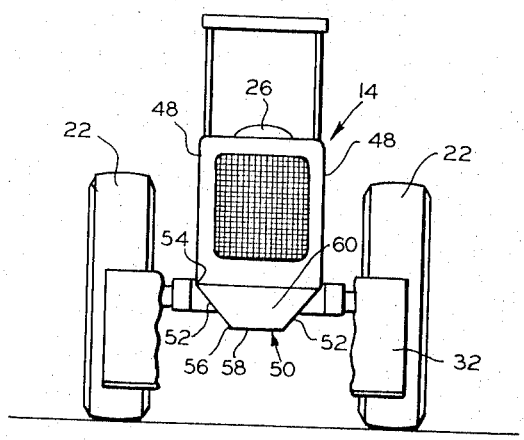
Figure 3:
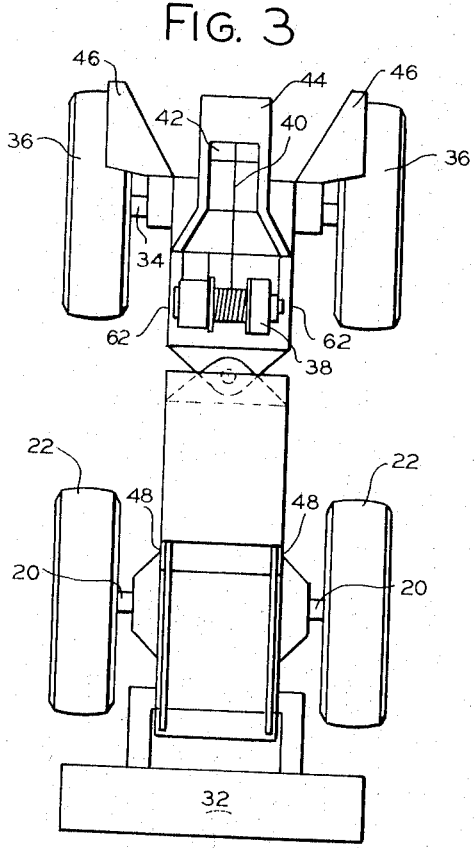
Figure 5:
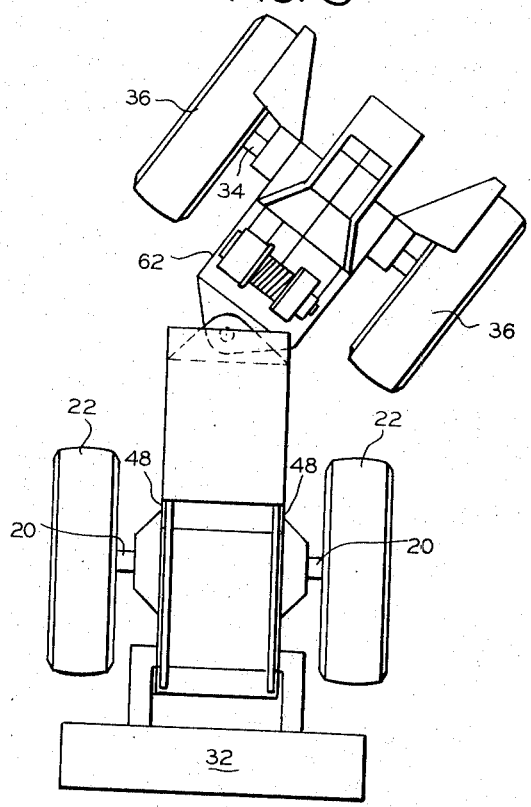
Figure 4:
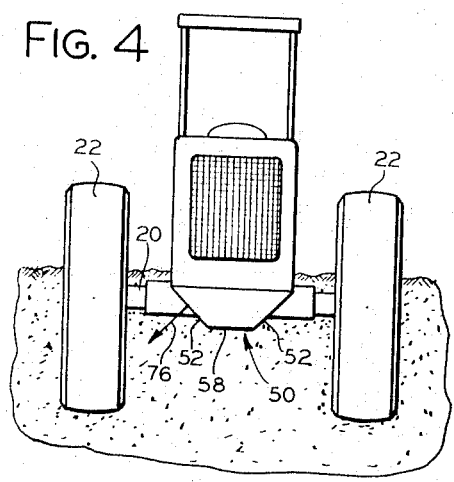
Figure 6:
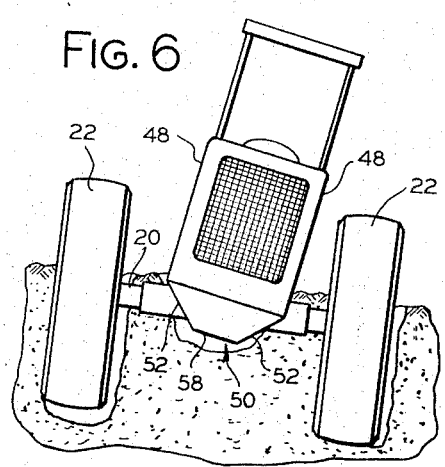

The above and other objects, features and advantages of my invention will be more readily understood when the following detailed description is taken in conjunction with the accompanying drawing wherein:

FIGURE 1 is a side elevation of a vehicle embodying my invention,

FIGURE 2 is a front elevation of the vehicle with a portion of the blade cut away, FIGURE 3 is a plan view of the vehicle in a non-articulated position, FIGURE 4 is a front elevation of the vehicle showing it mired in mud and with the blade removed, FIGURE 5 is a plan view of the vehicle in an articulated position, and FIGURE 6 is similar to FIG. 4, except that the vehicle has been articulated and as a result is elevated and tipped somewhat.

Referring now to the drawing, there is shown a vehicle which is denoted generally by the reference numeral 10. Vehicle 10 includes a body 12 which is made up of a front portion 14 and a rear portion 16. Body portions 14 and 16 are connected together at 18 for pivotal movement about a substantially vertical axis.

Front portion 14 is supported by an axle 20 at the outer ends of which are a pair of drive wheels 22. Front portion 14 also includes an operator's station 24 with a seat 26 and the various controls for operating the vehicle. Located forwardly of operator station 24 is an engine compartment 28 within which the vehicle prime mover is located. A pair of forwardly extending boom arms 30 are mounted on body portion 14 and carry a blade 32. Arms 30 are arranged to pivot about a horizontal axis so that blade 32 may be raised or lowered as necessary.

Rear portion 16 is supported by an axle 34 at the outer ends of which a pair of drive wheels 36 are mounted. Carried by rear portion 16 is a winch 38 which, together with drive wheels 22 and 36, is driven by the vehicle prime mover. Wound on winch 38 is a cable 40 which may be trained over roller 42 of fairlead 44 and attached to one or more logs.

Extending rearwardly of rear body portion 16 are a pair of fenders 46 which together with rear body portion 16 form a pocket within which the ends of logs being pulled by the vehicle may be disposed.

In operation cable 40 is attached to one or more cut logs which are lying on the ground. The cable is then taken up by the winch until the ends of the logs are pulled up into the pocket formed by fenders 46 and the rear of rear body portion 16. At this time the ends of the logs adjacent the vehicle are raised somewhat off the ground. The vehicle is then driven to the desired point to which it is wished to transport the logs, dragging the partially supported logs behind it.

Returning now to a description of front body portion 14, it will be noted that portion 14 includes a pair of generally vertical sides 48 and a bottom 50 which extends between sides 48. Bottom 50 includes a pair of downwardly and inwardly extending surfaces 52 which are connected at their upper edges 54 to sides 48 and connected at their lower edges 56 to a substantially horizontal surface 58. Also, bottom 50 includes a transversely extending sloped surface 60 at the front of bottom 50.

Similarly, rear body portion 16 includes a pair of longitudinally extending substantially vertical sides 62 and a bottom 64 which extends between sides 62. Bottom 64 includes a pair of surfaces 66 which extend inwardly and downwardly and are connected at their upper edges 68 to sides 62 and connected at their lower edges 70 to a substantially horizontal surface 72. Also, bottom 64 includes at the rear thereof a transverse surface 74 which slopes inwardly and downwardly.

Surfaces 52 and 66 preferably make an angle of 45° with the vertical, although this angle may vary from 30° to 60° and still be acceptable. Further, in order for surfaces 52 and 66 to function as intended they must have sufficient area to provide enough force in a vertical direction to tend to lift vehicle 10. I have found that in order to have sufficient area that the width of surfaces 52 and 66 should be not less than one-quarter of the distance between opposite upper edges 54 or 68.

In order to enable persons skilled in the art to better understand my invention, I will now explain the operation of it. It will be assumed that vehicle 10 is mired in mud to a point somewhat above the vehicle axles, as shown in FIG. 4, and that the vehicle is in a non-articulated position as shown in FIG. 3. Now, in order to enable vehicle 10 to free itself from the mud the operator manipulates the control so that body portions 14 and 16 articulate, as shown in FIG. 5, with the result that some of surfaces 52 and 66 push against the mud, and thus exert a downward force 76 against the mud which tends to lift vehicle 10 and tilt it somewhat, as shown in FIG. 6. This lifting effect, of course, helps free the vehicle from the mud, and the lifting together with the tipping helps to break any suction due to the cavity being formed beneath the vehicle body as it is lifting itself free of the mud. Articulation of body portions 14 and 16 are repeated in opposite directions until vehicle 10 is free of the mud. It will be understood, of course, that it will be necessary to drive the wheels 22 and 36 forwardly or rearwardly as the situation demands in conjunction with articulation of body portions 14 and 16 in order to free vehicle 10 of the mud.

While only a single preferred embodiment of my invention has been described in detail, it will be understood that it is not limited to logging vehicles, but could be just as readily applied to other vehicles that must negotiate rough terrain. Further, the above detailed description is intended to be illustrative only because other changes and modifications that would be within the scope and spirit of my invention may occur to others skilled in the art. The limits of my invention should be determined from the following appended claims.

I claim:
1. A vehicle comprising an elongated body, the said body including a front portion and a rear portion, a pair of body supporting wheels journaled on each said front and rear body portions, the said portions being connected for pivotal movement relative to each other about a substantially vertical axis, means for pivoting said body portions, each portion including a pair of longitudinally extending sides and a bottom extending between the said sides, the said bottom including a pair of longitudinally extending surfaces with upper and lower edges, the said surfaces extending downwardly and inwardly so that when the said surfaces are disposed in a semi-solid mass and the said body portions are pivoted relative to each other about the said substantially vertical axis some of the said surfaces are forced against the said semi-solid mass and exert a force which is directed downwardly and outwardly, the reaction to which tends to raise and tip the said body.

2. A vehicle as set forth in claim 1 wherein each of the said surfaces makes an angle with the vertical which is at least 30° and no greater than 60°.

3. A vehicle as set forth in claim 1 wherein the distance between the upper edges of opposite surfaces is no greater than four times the width of any one of the said opposite surfaces.

4. A vehicle as set forth in claim 1 wherein each of the said surfaces makes an angle with the vertical which is at least 30° and no greater than 60° and the distance between the upper edges of opposite surfaces is no greater than four times the width of any one of the said opposite surfaces.

5. A vehicle as set forth in claim 4 wherein the bottom of each portion includes a generally horizontal surface extending between the lower edges of the said downwardly and inwardly extending surfaces.

References Cited
UNITED STATES PATENTS

| 3,057,319 | 11/1962 | Wagner | 115—1 |
| 3,167,147 | 1/1965 | Symons et al. | 180—51 |
| 3,191,709 | 6/1965 | Symons et al. | 180—51 |

LEO FRIAGLIA, *Primary Examiner.*